(12) United States Patent
McKenney

(10) Patent No.: US 10,268,610 B1
(45) Date of Patent: Apr. 23, 2019

(54) DETERMINING WHETHER A CPU STALLING A CURRENT RCU GRACE PERIOD HAD INTERRUPTS ENABLED

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/998,729

(22) Filed: Aug. 16, 2018

(51) Int. Cl.
G06F 13/24 (2006.01)

(52) U.S. Cl.
CPC .......... *G06F 13/24* (2013.01); *G06F 2213/24* (2013.01)

(58) Field of Classification Search
None
See application file for complete search history.

(56) References Cited

U.S. PATENT DOCUMENTS

| | | | |
|---|---|---|---|
| 5,442,758 A | 8/1995 | Slingwine et al. |
| 5,608,893 A | 4/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,812 B2 | 2/2006 | McKenney |
| 7,162,666 B2 | 1/2007 | Bono |
| 7,191,272 B2 | 3/2007 | McKenney |
| 7,287,135 B2 | 10/2007 | McKenney et al. |
| 7,353,346 B2 | 4/2008 | McKenney et al. |
| 7,349,879 B2 | 6/2008 | McKenney et al. |
| 7,395,263 B2 | 7/2008 | McKenney |
| 7,395,383 B2 | 7/2008 | McKenney |
| 7,426,511 B2 | 9/2008 | McKenney |
| 7,454,581 B2 | 11/2008 | McKenney et al. |
| 7,472,228 B2 | 12/2008 | McKenney et al. |
| 7,653,791 B2 | 1/2010 | McKenney |
| 7,689,789 B2 | 3/2010 | McKenney et al. |

(Continued)

OTHER PUBLICATIONS

P. McKenney et al., "Read-Copy Update: Using Execution History to Solve Concurrency Problems," PDCS, Oct. 1998, 11 pages.

(Continued)

*Primary Examiner* — Idriss N Alrobaye
*Assistant Examiner* — Dayton Lewis-Taylor
(74) *Attorney, Agent, or Firm* — Walter W. Duft

(57) ABSTRACT

A technique for determining if a CPU stalling an RCU grace period has interrupts enabled. Per-CPU state information is maintained for the CPU, including an RCU grace-period number snapshot and an interrupt work-request indicator. If a current RCU grace period has endured for a predetermined time period, it is determined if there is a pending interrupt work request for the CPU. If not, an interrupt work request is generated and the interrupt work-request indicator is updated accordingly. In response to an RCU CPU stall-warning condition, it is determined if the interrupt work request was handled. An RCU CPU stall-warning message reports an interrupt-handling status of the CPU according to the interrupt work request handling determination. If the interrupt work request was not handled, the RCU CPU stall-warning message reports how many RCU grace periods elapsed while the interrupt work request was pending.

20 Claims, 8 Drawing Sheets

(56) References Cited

U.S. PATENT DOCUMENTS

| | | |
|---|---|---|
| 7,734,879 B2 | 6/2010 | McKenney et al. |
| 7,734,881 B2 | 6/2010 | McKenney et al. |
| 7,747,805 B2 | 6/2010 | McKenney |
| 7,814,082 B2 | 10/2010 | McKenney |
| 7,818,306 B2 | 10/2010 | McKenney et al. |
| 7,904,436 B2 | 3/2011 | McKenney |
| 7,953,708 B2 | 5/2011 | McKenney et al. |
| 7,953,778 B2 | 5/2011 | McKenney et al. |
| 8,020,160 B2 | 9/2011 | McKenney |
| 8,055,860 B2 | 11/2011 | McKenney et al. |
| 8,055,918 B2 | 11/2011 | McKenney et al. |
| 8,108,696 B2 | 1/2012 | Triplett |
| 8,126,843 B2 | 2/2012 | McKenney et al. |
| 8,176,489 B2 | 5/2012 | Bauer et al. |
| 8,185,704 B2 | 5/2012 | McKenney et al. |
| 8,195,893 B2 | 6/2012 | Triplett |
| 8,407,503 B2 | 3/2013 | McKenney |
| 8,495,641 B2 | 7/2013 | McKenney |
| 8,607,105 B1 | 12/2013 | Crosland et al. |
| 8,615,771 B2 | 12/2013 | McKenney |
| 8,706,706 B2 | 4/2014 | McKenney |
| 8,725,958 B2 | 5/2014 | Takata |
| 8,874,535 B2 | 10/2014 | McKenney |
| 8,924,655 B2 | 12/2014 | McKenney |
| 8,938,631 B2 | 1/2015 | McKenney |
| 8,972,801 B2 | 3/2015 | McKenney |
| 9,003,420 B2 | 4/2015 | McKenney |
| 9,189,413 B2 | 11/2015 | McKenney |
| 9,250,978 B2 | 2/2016 | McKenney |
| 9,256,476 B2 | 2/2016 | McKenney |
| 9,348,765 B2 | 5/2016 | McKenney |
| 9,396,226 B2 | 6/2016 | McKenney |
| 9,389,925 B2 | 7/2016 | McKenney |
| 9,411,636 B1 | 8/2016 | Ting et al. |
| 9,519,307 B2 | 12/2016 | McKenney |
| 9,552,236 B2 | 1/2017 | McKenney |
| 9,720,836 B2 | 8/2017 | McKenney |
| 9,785,548 B2 | 10/2017 | Kogan et al. |
| 9,886,329 B2 | 2/2018 | McKenney |
| 9,965,432 B2 | 5/2018 | McKenney |
| 2008/0082532 A1 | 4/2008 | McKenney |
| 2013/0061071 A1 | 3/2013 | McKenney |
| 2018/0046468 A1 | 2/2018 | McKenney |
| 2018/0060086 A1 | 3/2018 | McKenney |
| 2018/0095666 A1 | 4/2018 | McKenney |
| 2018/0165125 A1 | 6/2018 | McKenney |

OTHER PUBLICATIONS

P. McKenney et al., "Read-Copy Update," 2001 Ottawa Linux symposium, Jul. 2001, 22 pages.
H. Lindar et al., "Scalability of the Directory Entry Cache," 2002 Ottawa Linux Symposium, Jun. 26, 2002, pp. 289-300.
P. McKenney et al.,"Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 FREENIX, Jun. 14, 2003, 13 pages.
P. McKenney et al., "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[PATCH] slab: document SLAB_DESTROY_BY_RCU", LKML.org, Nov. 13, 2008, 1 page.
D. Sarma et al., "Making RCU Safe for Deep Sub-Millisecond Response Realtime Applications," 2004 USENIX (UseLinux track) Jun. 2004, 9 pages.
P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Oct. 9, 2006, 10 pages.
T. Gleixner, High Resolution Timers / Dynamic Tics—V2, LWN.net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWN.net, Aug. 1, 2007, 11 pages.
P. McKenney, "The design of preemptible read-copy-update," LWN.net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is RCU? Part 2: Usage, LWN.net,Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney, "The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions on Parallel and Distributed Systems, vol. x, No. y, Jul. 2009, pp. 1-14.
P. McKenney, "Making RCU Safe for Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.LITTLE", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
P. McKenney, "What Happens When 4096 Cores All Do synchronize_rcu_expedited()?", linux.conf.au, Geelong, Australia, Feb. 3, 2015.

(56) References Cited

OTHER PUBLICATIONS

L. Lian et al., Library, "Verification of the Tree-Based Hierarchical Read-Copy Update the Linux Kernel", Cornell University Library, pp. 1-14, Oct. 11, 2016.
P. McKenney, "A Tour Through RCU's Requirements", LWN.net; 2015, 36 pages.
S. Rostedt, "RCU stall when using function_graph", Linux Kernel Mailing List <lkml.org/lkml/2017/8/16/498, Aug. 16, 2017, 2 pages.
S. Rostedt, "RCU stall when using function_graph", Linux Kernel Mailing List <lkml.org/lkml/2017/8/16/594, Aug. 16, 2017, 1 page.

DETERMINING WHETHER A CPU STALLING A CURRENT RCU GRACE PERIOD HAD INTERRUPTS ENABLED

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data, thereby allowing destructive-to-reader actions to be performed. The second-phase update operation typically entails freeing a stale data element to reclaim its memory, and such operation may thus be referred to as a reclaimer. In certain RCU implementations, the second-phase update operation may involve a different kind of destructive-to-reader action, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This can be done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer ( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference ( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state, thereby allowing destructive-to-reader actions to be performed.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

In some RCU implementations, such as recent versions of the Linux® kernel, RCU issues stall warnings when a CPU hangs or otherwise blocks the completion of an RCU grace period for a predetermined time interval. Such stall warnings provide valuable diagnostics that can help identify software bugs. One piece of information not provided by conventional RCU CPU stall warnings is whether or not the CPU had interrupts enabled. Such information could help in troubleshooting the cause of a CPU stall, for example, whether the stall is due to long-running interrupt handlers. Such interrupt handler delay can result from certain diagnostic activities, such as when interrupt transaction logging is performed as part of function graph tracing. If a periodic interrupt's handler takes longer to execute than the time interval between successive interrupts, RCU's grace period kthreads and softirq handlers can be prevented from executing, thereby resulting in an otherwise inexplicable RCU CPU stall warning.

SUMMARY

A method, system and computer program product are provided that implement a technique for determining if a CPU stalling a read-copy update (RCU) grace period has interrupts enabled. In an embodiment, an RCU grace-period number snapshot is incorporated into per-CPU state information maintained on behalf of the CPU. The RCU grace-period number snapshot serves as an interrupt work-state grace period indicator for the CPU that is occasionally set to a current RCU grace period number. An interrupt work state of the CPU is implicitly initialized by virtue of the RCU grace period number being incremented during initialization of a new RCU grace period so as to be greater than the RCU grace-period number snapshot. Also incorporated into the per-CPU state information is an interrupt work-request indicator that indicates whether the CPU has an interrupt work request pending.

A determination is made if a current RCU grace period has endured for a predetermined time period relative to an RCU CPU stall-warning timeout interval. If so, the RCU grace-period number snapshot, a current RCU grace period number and the interrupt work-request indicator are used to determine if an interrupt work request for handling by the CPU has been generated during the current RCU grace period. If not, an interrupt work request is generated for handling by the CPU if it is fully online, and the interrupt work-request indicator is updated to indicate that the CPU has a pending interrupt work request.

In response to an RCU CPU stall-warning condition, the interrupt work-request indicator is checked to determine if the interrupt work request has been handled.

An RCU CPU stall-warning message is issued that reports an interrupt-handling status of the CPU according to whether the interrupt work request was handled. The CPU interrupt-handling status indicates that interrupts were enabled if the interrupt work request was handled, or indicates that interrupts were disabled if the interrupt work request was not handled.

In response to the interrupt work request not being handled, the RCU grace-period snapshot and a current grace period number are used to determine how many grace periods elapsed while the interrupt work request was pending, and the RCU CPU stall-warning message reports the number of elapsed grace periods.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1A:
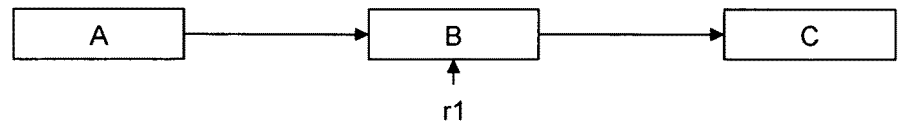
FIGS. 1A-1D are diagrammatic representations of a linked list of data elements undergoing a data element replacement according to a prior art read-copy update mechanism.
Figure 1B:
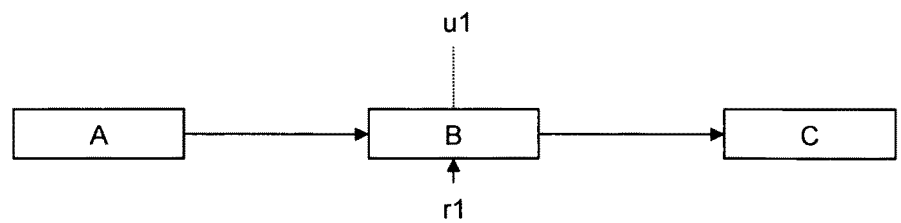
Figure 1C:
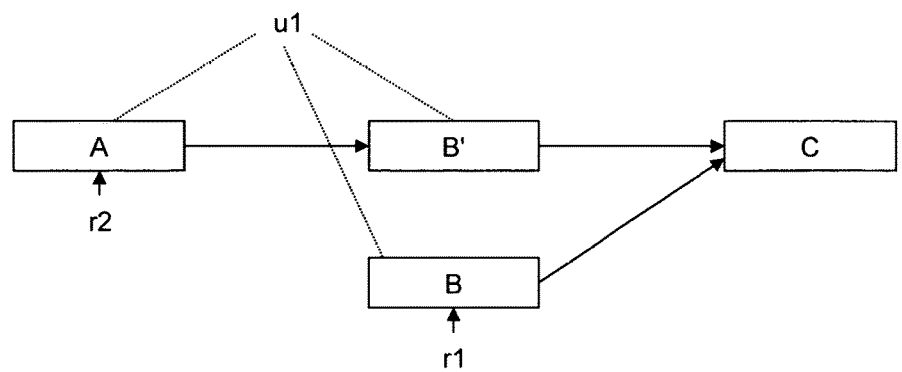
Figure 1D:
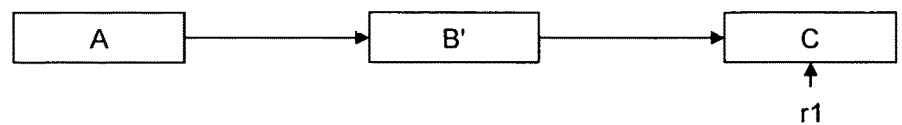
Figure 2A:
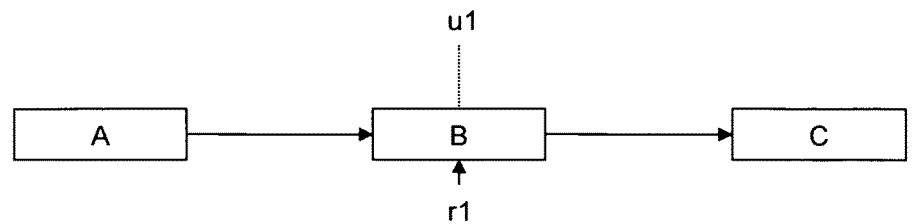
FIGS. 2A-2C are diagrammatic representations of a linked list of data elements undergoing a data element deletion according to a prior art read-copy update mechanism.
Figure 2B:
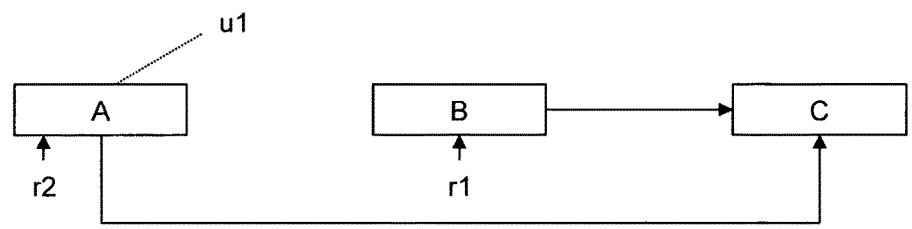
Figure 2C:
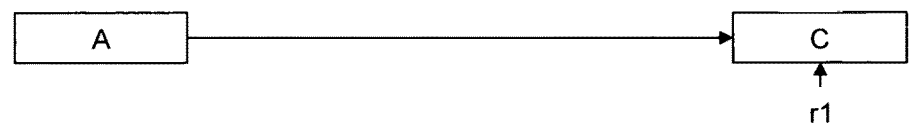
Figure 3:
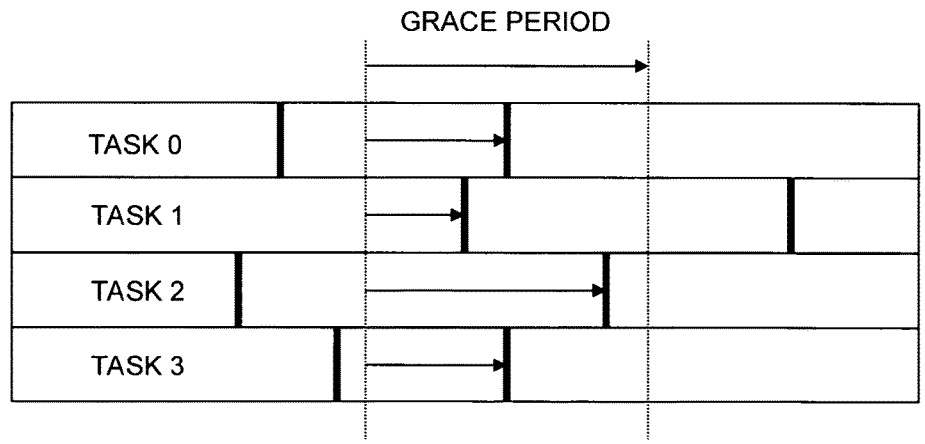
FIG. 3 is a flow diagram illustrating an example prior art grace period in which four processes pass through a quiescent state.
Figure 4:
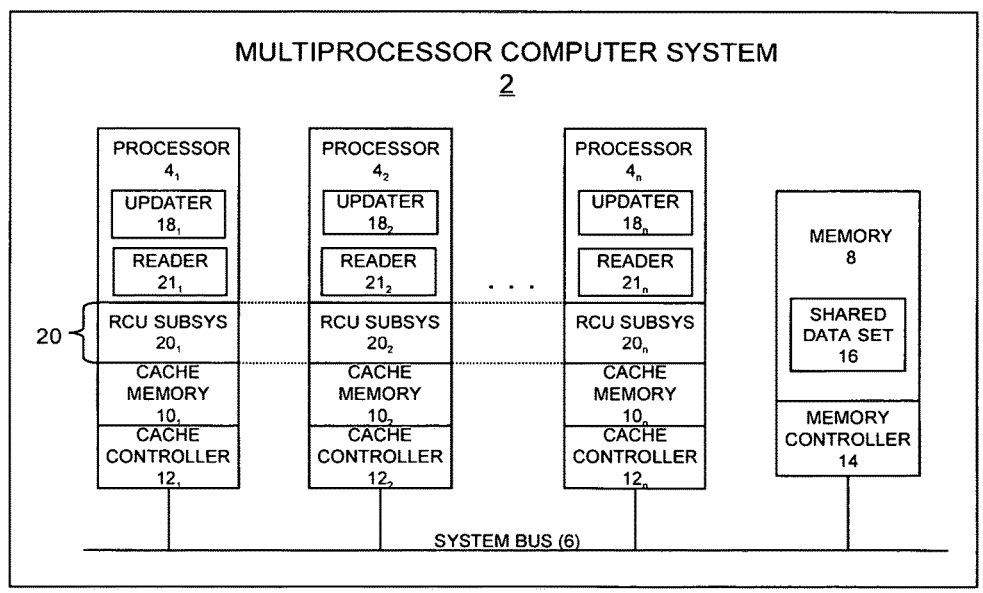
FIG. 4 is a functional block diagram showing an example multiprocessor computing system that implements the technique disclosed herein.

Turning now to the figures, wherein like reference numerals represent like elements in all of the several views, FIG. 4 illustrates an example multiprocessor computer system 2 in which a technique may be implemented for determining if a CPU stalling a read-copy update (RCU) grace period has interrupts enabled. The computer system 2 may include a plurality of CPUs (central processing units) 4 (e.g., $4_1$, $4_2 \ldots 4_n$) a system bus 6, and a main program memory 8. There may also be cache memories 10 (e.g., $10_1$, $10_2 \ldots 10_n$) and cache controllers 12 (e.g., $12_1$, $12_2 \ldots 12_n$) respectively associated with the CPUs 4. The cache memories 10 may be implemented in several levels (e.g., as level 1, level 2 and level 3 caches) and the cache controllers 12 may collectively represent the cache controller logic that supports each cache level. A memory controller 14 may be associated with the main memory 8. The memory controller 14 may reside separately from the CPUs 4, for example, as part of a discrete chipset, or alternatively, could be provided by plural memory controller instances that are respectively integrated with the CPUs 4.

The computer system 2 may represent any of several different types of computing apparatus. Such computing apparatus may include, but are not limited to, general purpose computers, special purpose computers, portable computing devices, portable computing-communication devices (such as smartphones), media player devices, set-top devices, embedded systems, and many other types of information handling machines. The term "CPU" as used with reference to the CPUs 4 encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The CPUs 4 may be situated within a single computing device or node (e.g., as part of a single-node SMP system) or they may be distributed over plural nodes (e.g., as part of a NUMA system, a cluster, or a cloud). The main memory 8 may be implemented using any suitable type of tangible storage medium capable of storing data in computer readable form for use in program execution, including but not limited to, any of various types of random access memory (RAM) (such as DRAM), various flavors of programmable read-only memory (PROM) (such as flash memory), and other types of primary storage (i.e., program memory). The cache memories 10 may likewise be implemented using any suitable type of primary storage, including but not limited to SRAM.

Each CPU 4 is operable to execute program instruction logic under the control of a software program stored in the main memory 8 (or elsewhere). As part of this program execution logic, update operations (updaters) 18 may execute within a process, thread, or other execution context (hereinafter "task") on any of the CPUs 4. Each updater 18 may run periodically to perform updates on a set of shared data 16 that may also be stored in the main memory 8 (or elsewhere). In FIG. 4, reference numerals $18_1$, $18_2$ . . . $18_n$ illustrate individual data updaters that respectively execute on the several CPUs $4_1$, $4_2$ . . . $4_n$. As described in the "Background" section above, the updates performed by an RCU updater can include modifying elements of a linked list, inserting new elements into the list, deleting elements from the list, and other types of operations. To facilitate such updates, the CPUs 4 may be programmed from instructions stored in the main memory 8 (or elsewhere) to implement a read-copy update (RCU) subsystem 20 as part of their data processing functions. In FIG. 4, reference numbers $20_1$, $20_2$ . . . $20_n$ represent individual RCU instances that may respectively periodically execute on the several CPUs $4_1$, $4_2$ . . . $4_n$. Operational details of the RCU subsystem 20 are described below.

Any given CPU 4 may also periodically execute read operations (readers) 21. Each reader 21 may run from program instructions stored in the main memory 8 (or elsewhere) in order to periodically perform read operations on the set of shared data 16 stored in the main memory (or elsewhere). In FIG. 4, reference numerals $21_1$, $21_2$ . . . $21_n$ illustrate individual reader instances that may respectively execute on the several CPUs $4_1$, $4_2$ . . . $4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

In an example embodiment, the readers 21 may be preempted while executing within their RCU read-side critical sections. This would be the case, for example, if the readers 21 embody kernel code paths in a preemptible operating system kernel. To accommodate such reader preemption, the RCU subsystem 20 may be configured as a preemptible RCU implementation.

During operation of the computer system 2, an updater 18 may occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may invoke the RCU subsystem 20 to track an RCU grace period for deferred destruction of the pre-update view of the data (second-phase update).

As discussed in the "Background" section above, it would be desirable to augment the information provided by RCU CPU stall warnings to indicate whether a stalled CPU had interrupts enabled. A technique that may be used to accomplish this end is to send an inter-processor interrupt (IPI) to the stalled CPU 4 and see whether or not it responds in a timely fashion, then report this information in an RCU CPU stall-warning message. Failure to handle the interrupt would be indicative of the CPU having interrupts disabled, while successful handling of the interrupt would indicate that the CPU has interrupts enabled. In practice, there are a number of complications that must be addressed in order to implement such a solution.

One complication is that the CPU 4 detecting a stall cannot itself stall waiting for the IPI response. Therefore, an asynchronous method is preferred. In an embodiment, the asynchronous irq_work mechanism found in existing versions of the Linux® kernel is used. The irq_work mechanism allows interrupt requests to be generated for asynchronous handling by a given CPU 4 that has interrupts enabled. In an embodiment, using the irq_work mechanism entails introducing a Linux® interrupt work request structure (of type irq_work) into per-CPU state information maintained on behalf of each CPU 4. The interrupt work request structure is used for posting interrupt work requests (of type irq_work) for handling by the CPU.

Another complication is that sending IPIs to idle CPUs is generally undesirable for energy-efficiency reasons. In an embodiment, doing so can be avoided in the common case by consulting RCU's dyntick-idle state.

A further complication stems from the fact that the following sequence of events can happen: (1) CPU $4_1$ submits an irq_work request, which sends an IPI to CPU $4_2$; (2) before the IPI arrives, CPU $4_2$ goes idle momentarily, then loops within the kernel with interrupts disabled; (3) RCU's grace-period kthread notes that CPU $4_2$ went idle, and therefore reports a quiescent state on its behalf; (4) the RCU grace period ends and another starts, but the irq_work request to CPU $4_2$ remains pending. In an embodiment, this is handled by determining a count of RCU grace periods that elapsed while the irq_work request is pending, and reporting the number of elapsed RCU grace periods in the RCU CPU stall-warning message.

A further complication arises from the fact that an irq_work request, once posted, cannot be cancelled, and may pend for any number of RCU grace periods before being handled. This means that an RCU CPU stall warning for a new RCU grace period must take into account the possibility that an irq_work request was posted during a prior RCU grace period. In an embodiment, this is handled by again allowing the irq_work request to pend, and reporting the number of elapsed RCU grace periods in the RCU CPU stall-warning message.

A further complication arises from the fact that it is possible to place a call to RCU's cond_resched_rcu_qs ( ) macro within a kernel code sequence that has interrupts disabled, even though doing so constitutes a bug that can result in "scheduling while atomic" console error messages. In an embodiment, this is handled by accommodating the possibility that an arbitrarily large number of RCU grace periods will elapse with a very old irq_work request still pending.

A further complication is that some or all of the RCU grace periods that elapse with a very old irq_work request still pending might issue RCU CPU stall warnings. In an embodiment, this is handled by including the previously-mentioned reporting of the number of elapsed RCU grace periods in the RCU CPU stall-warning message.

A further complication arises from the desirability of avoiding having to reset a portion of each CPU 4's state at the beginning of each grace period, namely an irq_work state (also referred to herein as an interrupt work state) that indicates whether a CPU 4 can be assigned an irq_work request within a particular RCU grace period. In practice, starting an RCU grace period does not currently require examining each CPU 4's state. Adding per-CPU state examination could unduly increase RCU grace-period overhead on large busy systems whose workloads undergo frequent (e.g., sub-millisecond) context switches. Although it may be tempting to have each CPU 4 reset its own irq_work state when it first becomes aware of a new grace period, this could be problematic in practice because (1) long-term idle CPUs never notice beginnings of RCU grace periods, (2) a CPU might not notice the beginning of a grace period until after the test for interrupts being enabled needs to be performed, and in fact (3) a CPU with interrupts disabled is guaranteed not to notice the beginning of an RCU grace period.

In an embodiment, there is no need to add a full scan of all CPUs to RCU's grace-period initialization, or to have each CPU reset a portion of its own state. Instead, a grace period number snapshot can be maintained as part of each CPU 4's per-CPU state information. The RCU grace period number snapshot serves as an irq_work state grace period indicator for the CPU 4, and defines part of the CPU's overall irq_work state (described in more detail below in connection with FIG. 7). As will be discussed hereinafter, a CPU's RCU grace period snaphot may be set to a current RCU grace period number whenever an irq_work request is generated for handling by the CPU 4. The RCU grace period snapshot may again be set to the current RCU grace period number when the irq_work request is subsequently handled, following a determination of the number of RCU grace periods that elapsed while the irq_work request was pending. The condition of a CPU 4's RCU grace period snapshot being equal to the current RCU grace period number indicates that the CPU is in an irq_work state wherein it cannot be assigned any further irq_work requests within the current RCU grace period. Thereafter, the irq_work state of the CPU 4 will be implicitly initialized by virtue of the RCU grace period number being incremented during initialization of a new RCU grace period so as to be greater than the RCU grace-period number snapshot. This condition indicates that the CPU 4 is in an irq_work state wherein it can be assigned new irq_work requests within the current RCU grace period, provided the RCU grace period has endured for a predetermined time period relative to an RCU CPU stall-warning timeout interval.

A further complication is that CPUs 4 can go offline in the middle of an RCU grace period, and posting an irq_work request to an offline CPU is not productive. In an embodiment, this possibility is avoided by maintaining a list of CPUs that are fully online.

Figure 5:
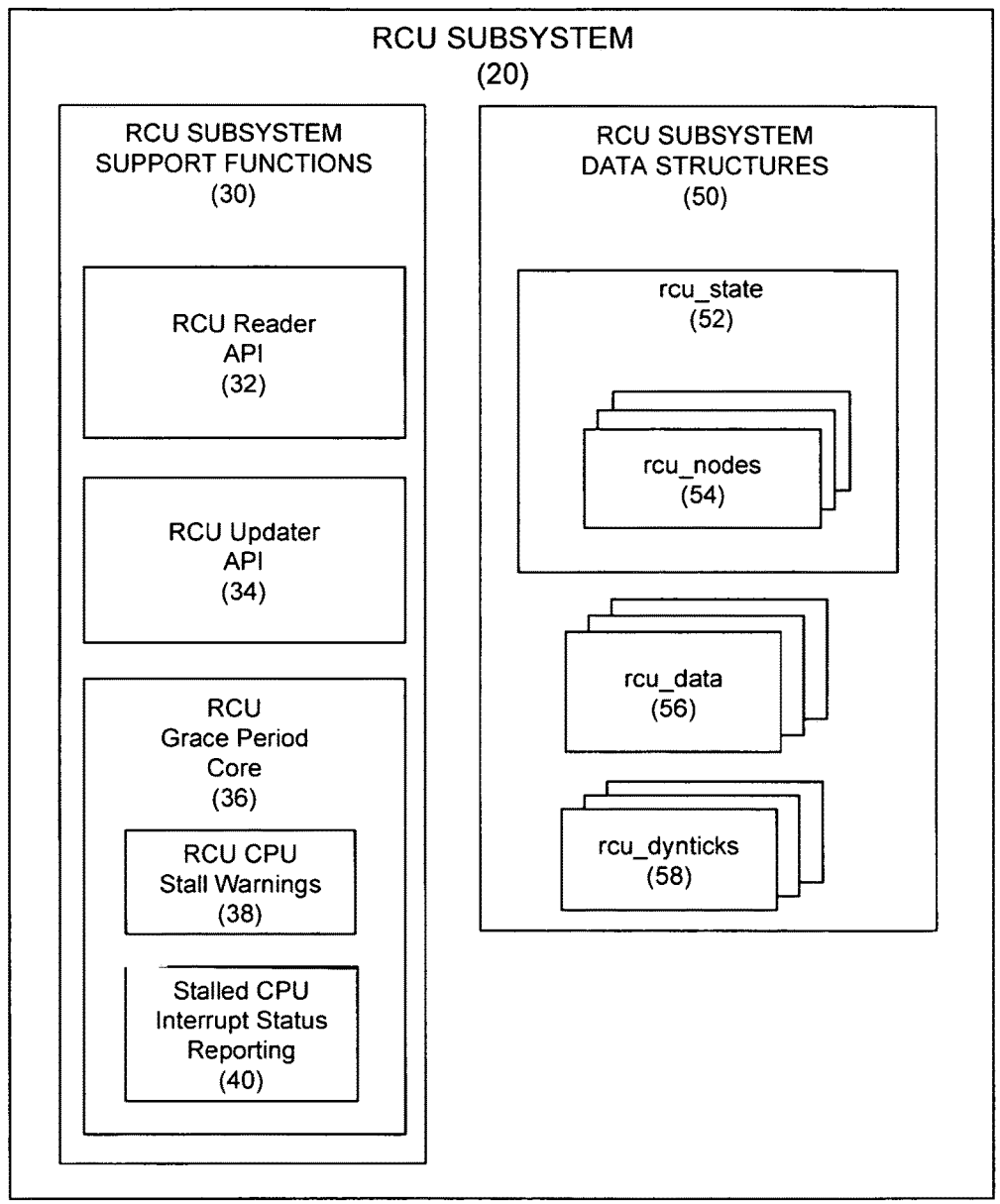
FIG. 5 is a functional block diagram showing an example RCU subsystem that may be provided in the computer system of FIG. 4.

Turning now to FIG. 5, the RCU subsystem 20 may include a set of RCU subsystem support functions 30. Example components of the RCU subsystem support functions 30 may include an RCU reader API (Application Programming Interface) 32, an RCU updater API 34 and an RCU grace period processing core 36.

The RCU reader API 32 may include a reader registration component and a reader unregistration component that are respectively invoked by the readers 21 as they enter and leave their RCU read-side critical sections to read the shared data 16. This allows the RCU subsystem 20 to track reader operations and determine when the readers 21 are engaged in RCU-protected read-side critical section processing. In an example embodiment, the reader registration and unregistration components may be respectively implemented using the rcu_read_lock ( ) and rcu_read_unlock ( ) primitives found in the existing RCU implementations.

The RCU updater API 34 may include various synchronization primitives for use by the updaters 18 to defer removal of the shared data 16 that may be referenced by the readers 21 until an RCU grace period has elapsed. These synchronization primitives may include normal grace period primitives such as synchronize_rcu ( ), and call_rcu ( ), as well as expedited grace period primitives such as synchronize_rcu_expedited ( ).

The RCU grace period core 36 may include a set of functions that cooperate to perform various RCU grace period processing operations. Examples of such functions include starting new RCU grace periods and detecting the ends of old RCU grace periods by waiting for CPUs 4 in the computer system 2 to pass through quiescent states. For efficiency reasons, such as reducing real-time latency, these functions may operate within the context of a kernel thread, such as a Linux® kthread. This kthread is sometimes referred to as an RCU "grace period kthread." The RCU grace period core 36 may further include functionality 38 that support RCU CPU stall warnings on behalf of CPUs that delay RCU grace periods. In an embodiment, the disclosed technique for determining if a CPU stalling an RCU grace period has interrupts enabled may be handled by stalled-CPU interrupt-status reporting functionality 40 that is also provided as part of the RCU grace period core 36.

With continuing reference now to FIG. 5, the RCU subsystem 20 may include a set of data structures 50 that support operations of the RCU grace period core 36. The data structures 50, which may be implemented as C-language struct composite data type variables, include an rcu_state structure 52 having embedded therein (e.g., as a linear array) a combining tree of rcu_node structures 54. The RCU subsystem 20 thus supports hierarchical grace period detection, and may be characterized as a hierarchical RCU implementation. The combining tree of rcu_node structures 54 tracks information needed to determine when RCU grace periods have elapsed. Such tracked information may include, within each rcu_node structure 54, various quiescent state reporting and tracking structures that identify CPUs 4 which have or have not passed through a quiescent state.

The data structures 50 of the RCU subsystem 20 further a set of per-CPU rcu_data structures 56 and a set of per-CPU rcu_dynticks data structures 58 that may either be separate from or merged into the rcu_data structures. Each rcu_data structure 56 represents one CPU 4 in the computer system 2, and is used to maintain RCU-related information specific to that CPU, such as RCU callback lists, local quiescent-state and grace-period handling information, and other data. Each rcu_dynticks structure 58 maintains a counter that indicates whether or not a given CPU 4 is in an offline or lower-power idle state. The CPUs 4 may periodically access their rcu_dyntticks structures 58 to record state transitions, such as when a CPU enters or leaves the dyntticks-idle state wherein an idle CPU does not receive scheduling clock interrupts.

Figure 6:
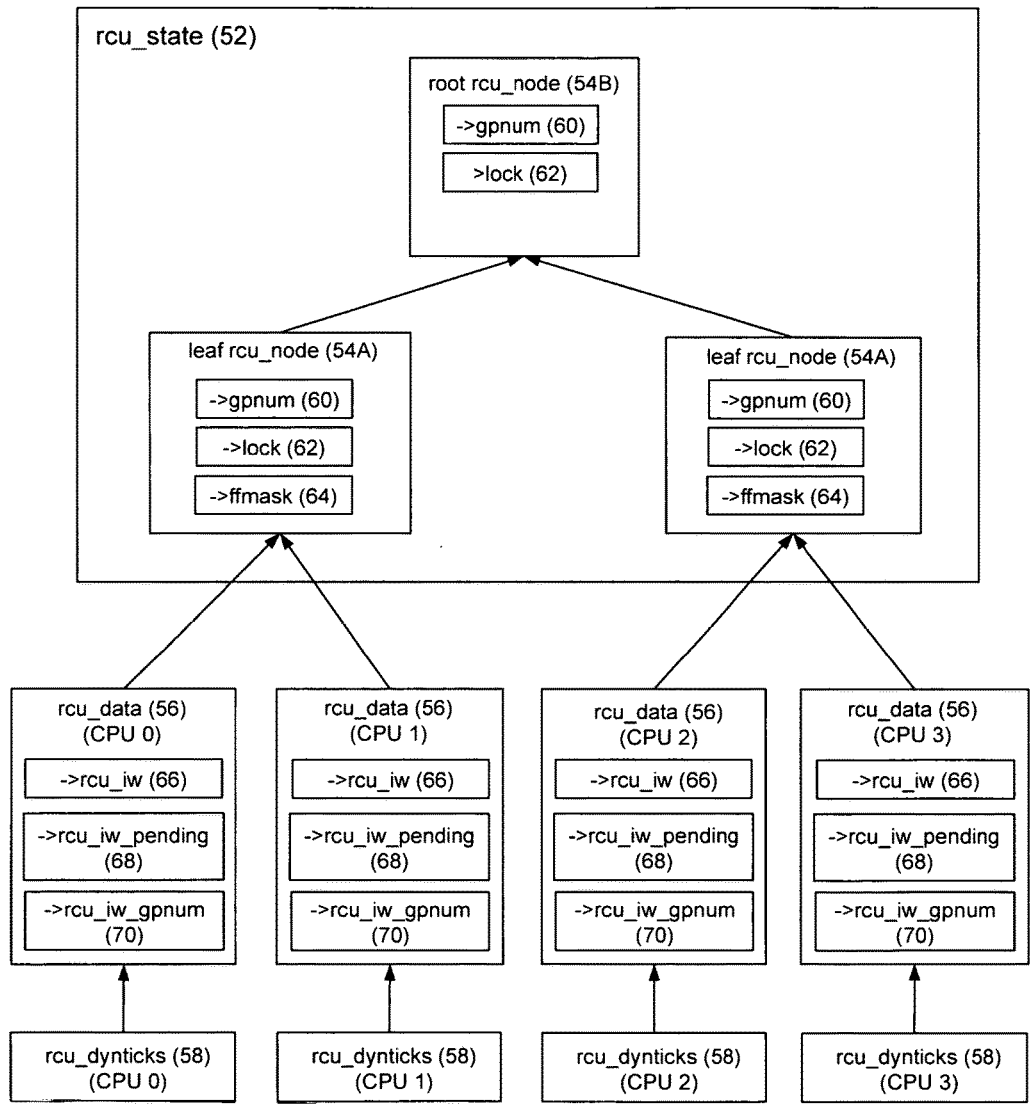
FIG. 6 is a functional block diagram showing example data structures of the RCU subsystem of FIG. 5.

FIG. 6 illustrates an example of an rcu_state structure 52 embodied as a two-level combining tree of rcu_node structures 54. This rcu_node structure hierarchy includes two bottom-level leaf rcu_node structures 54A and a single top level root rcu_node structure 54B. In a larger system with many CPUs 4, the combining tree could be expanded to include one or more additional levels of rcu_node structures 54. For purposes of simplified discussion, FIG. 6 depicts two rcu_data structures 56 assigned to each leaf rcu_node structure 54A. The CPUs 4 associated with the respective rcu_data structures 56 (i.e., CPUs 0, 1, 2 and 4) each have a corresponding rcu_dyntticks structure 58 associated therewith.

As found in existing Linux® RCU implementations, each rcu_node structure 54 tracks RCU grace periods by way of a →gpnum grace period number field 60. The →gpnum field 60 is updated by the RCU grace period core 36 at the start of each RCU grace period. As also found in in existing Linux® RCU implementations, each rcu_node structure 54 maintains a →lock field 62 that protects accesses to the various rcu_node structure fields, such as at the beginnings and ends of RCU grace periods.

In an embodiment, a new →ffmask field 64 is added to each leaf rcu_node structure 54A. As described in more detail below, the →ffmask field 64 is a bitmask that maintains one bit for each CPU 4 whose rcu_data structure 56 is assigned to a given leaf rcu_node structure 54A. In an embodiment, access to the →ffmask field 64 in a leaf rcu_node structure 54A may be protected by the rcu_node structure's →lock 62. Setting a CPU 4's bit in the →ffmask field 64 (e.g., to "1") signifies that the CPU is fully functional, and thus online and capable of handling irq_work requests. If the CPU 4 is not fully functional, its bit in the →ffmask field 64 will be cleared (e.g., to "0"). In an embodiment, RCU's existing CPU hotplug code may be modified to manipulate the bits of the →ffmask field 64 as a CPU 4 transitions between online and offline states. For example, RCU's existing rcutree_online_cpu ( ) function, which is invoked near the end of the CPU-hotplug operation for an incoming CPU 4, may be modified to set the CPU's bit in its rcu_node structure's →ffmask 64 (after acquiring the rcu_node structure's →lock 62). Likewise, RCU's existing rcutree_offline_cpu ( ) function, which is invoked near the beginning of the CPU-hotplug operation for an outgoing CPU 4, may be modified to clear the CPU's bit in its rcu_node structure's →ffmask 64 (after acquiring the rcu_node structure's →lock 62).

It will be appreciated that the →ffmask field 64 addresses the complication mentioned above in which a CPU 4 can go offline in the middle of an RCU grace period, such that generating an irq_work request to the offline CPU would not be productive. A check of the →ffmask field 64 can be made before generating an irq_work request to a CPU 4 to confirm that the CPU is in fact online. If the CPU's →ffmask bit 64 is set, the CPU is guaranteed to accept the irq_work request provided the CPU is in an interrupts-enabled state.

In an embodiment, the rcu_data structures 56 are enhanced to add three new data fields, namely, an irq_work structure 66 that may be named →rcu_iw, a Boolean variable 68 that may be named →rcu_iw_pending, and an integer variable 70 that may be named →rcu_iw_gpnum.

The →irq_work structure 66 of a CPU 4's rcu_data structure 56 serves as an example interrupt work-request structure that is used to post irq_work requests to a CPU 4. It may be protected by the →lock 62 of the CPU 4's leaf rcu_node structure 54A. The irq_work data type used for the →irq_work structure 66 is part of the existing Linux® irq_work infrastructure. As is known, the existing irq_work infrastructure includes the irq_work_queue_on ( ) function that performs the actual posting of irq_work requests. This function may be utilized in an embodiment of the present disclosure, and is discussed in more detail below.

The →rcu_iw_pending field 68 of a CPU 4's rcu_data structure 56 serves as an example interrupt work-request indicator flag that indicates whether or not the CPU has an irq_work request pending. As described below in connection with FIG. 7, this flag assists in defining a CPU 4's irq_work state. The flag may be protected by the →lock 62 of the CPU 4's leaf rcu_node structure 54A.

As also discussed in connection with FIG. 7 below, the →rcu_iw_gpnum field 70 of a CPU's rcu_data structure 56 helps further define a CPU's irq_work state. This field may likewise be protected by the →lock 62 of the CPU 4's leaf rcu_node structure 54A. The field maintains the above-discussed RCU grace period number snapshot that serves as an irq_work state grace period indicator for a CPU 4. As previously discussed, a CPU 4's RCU grace period snapshot (as stored in the CPU's →rcu_iw_gpnum field 70) is occasionally set to a current RCU grace period number, which may be the value of the →gpnum field 60 of the CPU's leaf rcu_node structure 54A. As also mentioned, the condition in which the RCU grace period snapshot (stored in the →rcu_iw_gpnum field 70) equals the current RCU grace period number (stored in the →gpnum field 60) indicates that the CPU 4 is in an irq_work state wherein it may not be assigned new irq_work requests within the current RCU grace period. Thereafter, the irq_work state of the CPU 4 will be implicitly initialized when the RCU grace period number (stored in the →gpnum field 60) is incremented during initialization of a new RCU grace period so as to be greater than the RCU grace period snapshot (stored in the →rcu_iw_gpnum field 70). This condition indicates that the CPU is in an irq_work state wherein it may be assigned new irq_work requests within the current RCU grace period, provided the RCU grace period has endured for a predetermined time period relative to an RCU CPU stall-warning timeout interval. Advantageously, this implicit initialization of each CPU 4's irq_work state leverages RCU's normal grace period initialization operations, imposing no additional grace period processing overhead on RCU's grace period kthread.

As will now be discussed, the →rcu_iw_pending field 68 and the →rcu_iw_gpnum field 70 of a CPU's rcu_data structure 56 together define the complete irq_work state for the CPU. The resulting per-CPU irq_work state machine 80 is illustrated in FIG. 7.

Figure 7:
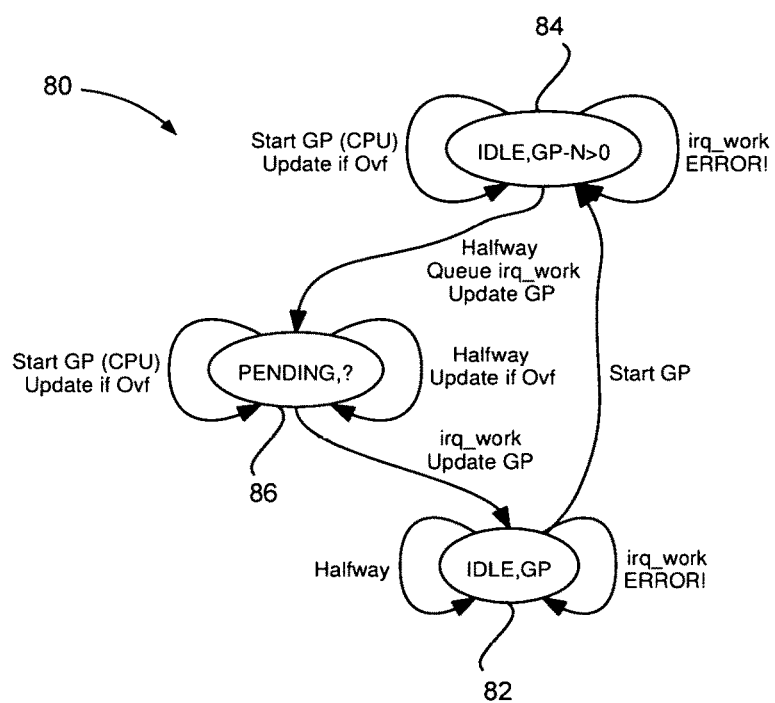
FIG. 7 is a state diagram illustrating example interrupt work states of a CPU in accordance with the technique disclosed herein.

FIG. 7 depicts three irq_work states 82, 84 and 86 of a CPU 4. The "IDLE" and "PENDING" designations of irq_work states 82/84 and 86, respectively, indicate a value of false and true, respectively, for the →rcu_iw_pending field 68 of the CPU 4's rcu_data structure 56. The "GP" designation of irq_work state 82 indicates that the →rcu_iw_gpnum field 70 of the CPU 4's rcu_data structure 56 is equal to the corresponding →gpnum field 60 of the CPU's leaf rcu_node structure 54A. The "GP-N>0" of irq_work state 84 indicates that the →gpnum field 60 and the →rcu_iw_gpnum field 70 are not equal. The "?" designation of irq_work state 86 indicates that there is not necessarily any relation between the →gpnum field 60 and the →rcu_iw_gpnum field 70.

The irq_work state 82 represents a combination of the "IDLE" and "GP" conditions. As discussed in more detail below, irq_work state 82 will only be reached after the CPU handles a previously-generated irq_work request in a timely manner within the current RCU grace period. When such timely handling occurs, and irq_work state 82 is reached, an error condition will result if an attempt is made to post another irq_work request to the CPU 4 within the same grace period. This is reflected by the loop labeled "irq_work ERROR!" that generates an error and produces no change of irq_work state. The loop labeled "Halfway" also results in no action being taken so long as the CPU 4 remains in irq_work state 82. This condition pertains to when an irq_work request will be generated for handling by the CPU 4 during a given RCU grace period. It only produces an irq_work state change when the CPU 4 is in irq_work state 84, as will now be discussed.

The irq_work state 84 represents a combination of the "IDLE" and "GP N>0" conditions. In this state, the CPU 4 is still IDLE because it has no pending irq_work request, but a new RCU grace period has started. The latter condition is indicated by the "Start GP" edge between the irq_work states 82 and 84. As part of grace period initialization, RCU's grace period kthread increments the →gpnum field 60 in all rcu_node structures 54. When this occurs, the CPU 4's →rcu_iw_gpnum grace period snapshot 70 will begin to lag behind the current RCU grace period number stored in the →gpnum field 60. This condition is reflected by the "GP-N>0" designation in irq_work state 84. When this occurs, the CPU 4 becomes ready to handle new irq_work requests, but no such requests will be generated until the RCU grace period endures for a predetermined time period relative to the RCU CPU stall-warning timeout interval, as represented by the "Halfway" condition. So long as the predetermined time period has not yet expired in irq_work state 84, the loop labeled "irq_work ERROR!" will continue to be applied.

The irq_work state 84 further includes a loop labeled "Start GP (CPU)." This operation indicates that the CPU 4's irq_work state remains the same in the event that another new RCU grace period is started and there is another incrementation of the →gpnum field 60 in the rcu_node structures 54 without also incrementing the CPU's →rcu_iw_gpnum field 70. Recall that this is the normal course of events whenever a new RCU grace period is started in order to avoid the addition of unnecessary grace period processing overhead.

As each new RCU grace period starts, the CPU 4's →rcu_iw_gpnum field 70 will lag further and further behind. If multiple RCU grace periods are started, the grace period lag can become significant. This situation may be addressed by the loop operation labeled "Update if Ovf," which is a periodic operation that checks for an impending overflow of the →gpnum field 60 relative to the →rcu_iw_gpnum field 70. In theory, it is possible for as many new RCU grace periods to occur as the →gpnum field 60 is capable of tracking, resulting in overflow of the RCU grace period number relative to the →rcu_iw_gpnum field 70. To avoid this situation, the "Update if Ovf" operation checks for an impending overflow, and if the →rcu_iw_gpnum field 70 is lagging too far behind the →gpnum field 60, the former can be updated so as to prevent the overflow. In an embodiment, the →rcu_iw_gpnum field 70 may be updated if it lags the →gpnum field 60 by ULONG_MAX/4 grace periods, where ULONG_MAX is a Linux® macro representing the maximum value of an unsigned long integer. If this limit is reached, the →rcu_iw_gpnum field 70 may be updated to appear as if it is ahead of the →gpnum field 60 by ULONG_MAX/4 grace periods (or by some other number of RCU grace periods).

In an embodiment, an "Update if Ovf" check for impending overflow may be performed by the RCU grace-period kthread running on a CPU 4 whenever the CPU is online, non-idle and notes a new RCU grace period. In an embodiment, this check may be performed by modifying RCU's_note_gp_changes ( ) function, which is invoked by any online CPU 4 that avoids going idle for the full duration of an RCU grace period. In that case, the RCU grace period cannot end unless the CPU 4 notes that the grace period has started, which is handled by the _note_gp_changes ( ) function.

In an embodiment, an "Update if Ovf" check for impending overflow may also be performed by the RCU grace-period kthread on behalf of a CPU 4 if it enters an idle state at some point during an RCU grace period. In that case, it is it is possible that the CPU 4 never will note that the RCU grace period has started. However, RCU's grace-period kthread will report the CPU 4's idle-loop quiescent state on behalf of the CPU when either of the existing dyntick_save_progress_counter ( ) or rcu_implicit_dynticks_qs ( ) functions return 1. Therefore, in an embodiment, the return path of these functions may be modified to include the "Update if Ovf" check.

After the CPU 4 has been within irq_work state 84 for a predetermined time period relative to an RCU CPU stall-warning timeout interval, an irq_work request will be generated for handling by the CPU. In an embodiment, this time period is half of an RCU CPU stall-warning timeout interval commencing from the start an RCU grace period, hence the "Halfway" designation. As can be seen in FIG. 7, the "Halfway" condition only produces a state change on the edge between irq_work states 84 and 86, causing the CPU 4 to leave irq_work state 84 and enter irq_work state 86.

The irq_work state 86 represents a combination of the "PENDING" and "?" conditions. In this state, the CPU 4 is no longer IDLE because it now has a pending irq_work request due to the fact that the current RCU grace period endured for a predetermined time period relative to an RCU CPU stall-warning timeout interval (e.g., the "Halfway" condition). In an embodiment, the operation that generates the new irq_work request also resets the →rcu_iw_gpnum field 70 of the CPU's rcu_data structure 56 so as to be equal to the →gpnum field 60 of the CPU's leaf rcu_node structure 54A. These operations are indicated by the "Halfway Queue Work Update GP" edge between irq_work states 84 and 86.

As noted above, the "Halfway" condition refers to an example time period that is half of an RCU CPU stall-warning timeout interval that starts at the commencement of a new RCU grace period. In an embodiment, if the current RCU grace period endures for that long, an irq_work request is generated for handling by a CPU 4, provided the CPU is online and in irq_work state 84. The exact time interval used as the condition for generating the irq_work request is a matter of design choice. However, the "Halfway" condition has certain advantages due to the fact that the RCU grace period core 36 of existing Linux® RCU implementations already performs other processing at this point.

Within irq_work state 86, the loop designated "Start GP (CPU) Update if Ovf" refers to the fact that multiple RCU grace periods may be started while an irq_work request to the CPU 4 is pending. An impending overflow of the →gpnum field 60 in the CPU's leaf rcu_node structure 54A relative to the →rcu_iw_gpnum field 70 in the CPU's rcu_data structure 56 will be corrected by the "Update if Ovf" operation. The loop designated "Halfway Update if Ovf" refers to the fact that detection of the "Halfway" condition during any given RCU grace period within irq_work state 86 will not trigger the generation of an additional irq_work requests if one is already pending. However, the "Update if Ovf" operation will still be performed to address any impending overflow of the →gpnum field 60 relative to the →rcu_iw_gpnum field 70.

The edge designated "irq_work Update GP" between irq_work states 86 and 82 represents the CPU 4 actually handling the pending irq_work request. As previously noted, there will also be a reset of the →rcu_iw_gpnum field 70 of the CPU's rcu_data structure 56 to equal the current value of the →gpnum field 60 in the CPU's leaf rcu_node structure 54A. The rcu_iw_pending field 68 will also be cleared, causing the CPU to transition from irq_work state 86 to irq_work state 82.

In the event that an RCU CPU stall-warning condition is reached during any given RCU grace period, the RCU CPU stall warning functionality 38 of FIG. 5 will generate an appropriate RCU CPU stall-warning message based on whether the CPU 4 is in irq_work state 82, 84 or 86. Based on the preceding discussion, it will be appreciated that determining the CPU 4's irq_work state is a matter of checking the →rcu_iw_pending and →rcu_iw_gpnum fields 68 and 70 of the CPU's rcu_data structure 56, and the →gpnum field 60 of the CPU's leaf rcu_node structure 54A.

If the CPU 4 is online and in irq_work state 82 when the RCU CPU stall-warning condition is reached, it means that an irq_work request was generated and handled by the CPU 4 during the current RCU grace period. In that case, it may be inferred that interrupts are enabled on the stalled CPU 4, and the RCU CPU stall-warning message may indicate an interrupts-enabled state.

If the CPU 4 is online and in irq_work state 86 when the RCU CPU stall-warning condition is reached, it means that the CPU 4 has a pending irq_work request that it did not handle during the current RCU grace period. In that case, it may be inferred that interrupts are disabled on the stalled CPU 4, and the RCU CPU stall-warning message may indicate an interrupts-disabled state. In further response to this condition, the CPU's →gpnum field 60 may be compared to its →rcu_iw_gpnum field 70, and the RCU CPU stall-warning message may additionally indicate how many RCU grace periods have elapsed while the irq_work request was pending.

If the CPU 4 is in irq_work state 84 when the RCU CPU stall-warning condition is reached, the CPU must be offline or idle. Otherwise, it would have transitioned to irq_work state 86 when the "Halfway" condition was reached. In that case, it may be inferred that it is not possible to queue an irq_work request to the CPU 4, and the RCU CPU stall-warning message may indicate this condition.

In an embodiment, the RCU CPU stall warning message may use a compact representation of the CPU 4's interrupt-handling status. According to this compact representation, a single character indicator may be generated that is either (1) a character (e.g., ".") indicating that the CPU had interrupts enabled for some part of the current RCU grace period, (2) a digit (e.g., "0"-"9") indicating a count of RCU grace periods during which the CPU had its interrupts disabled, or (3) a character (e.g., "!") indicting that it was not possible to post an interrupt work request to the CPU because it was offline. Note that for item (2) above, a digit value of "0" does not mean that that interrupts are enabled, but rather that interrupts have been disabled for only a fraction of the current grace period.

Figure 8A:
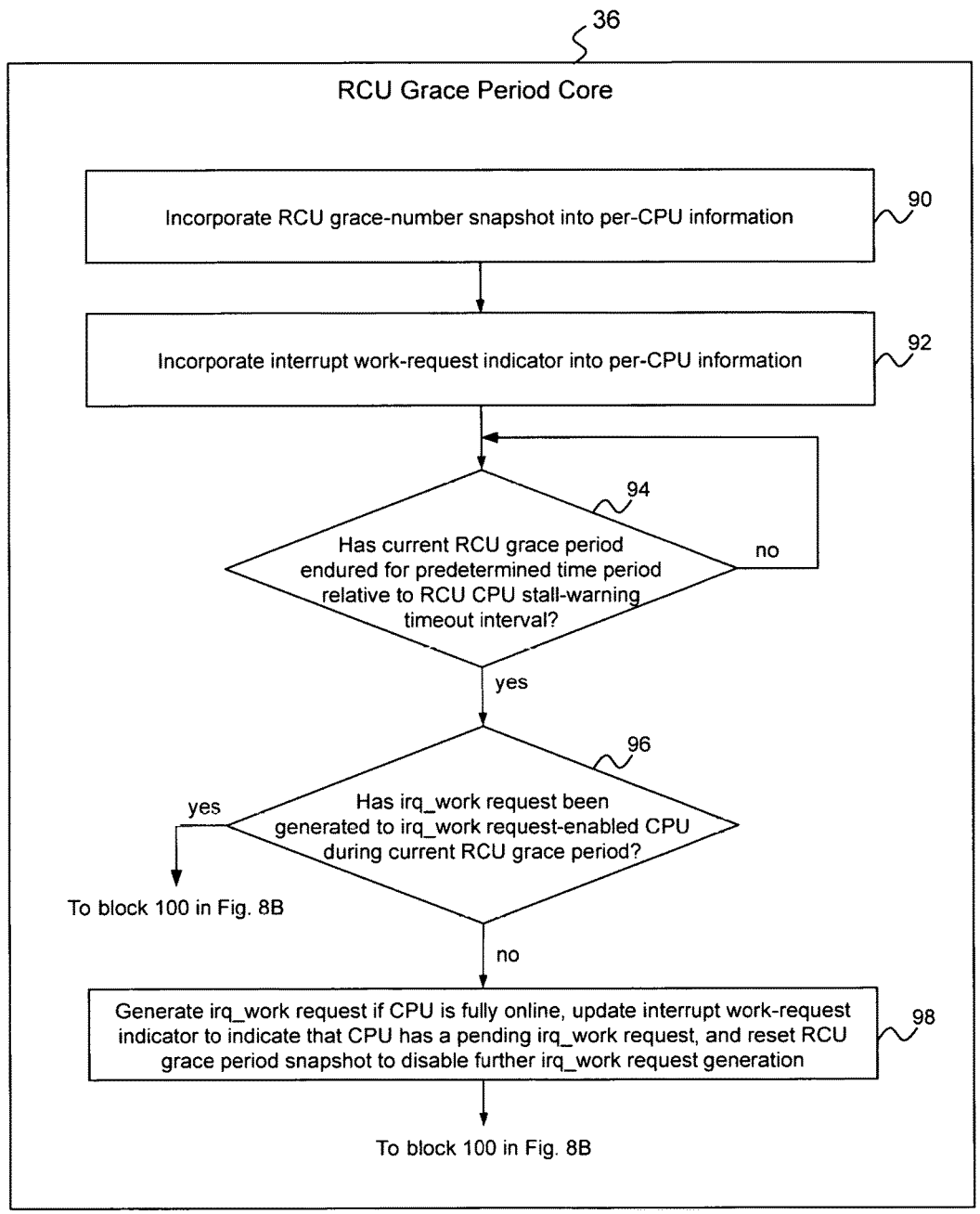
FIGS. 8A and 8B collectively represent a single flow diagram illustrating example operations that may be performed in accordance with the technique disclosed herein.
Figure 8B:
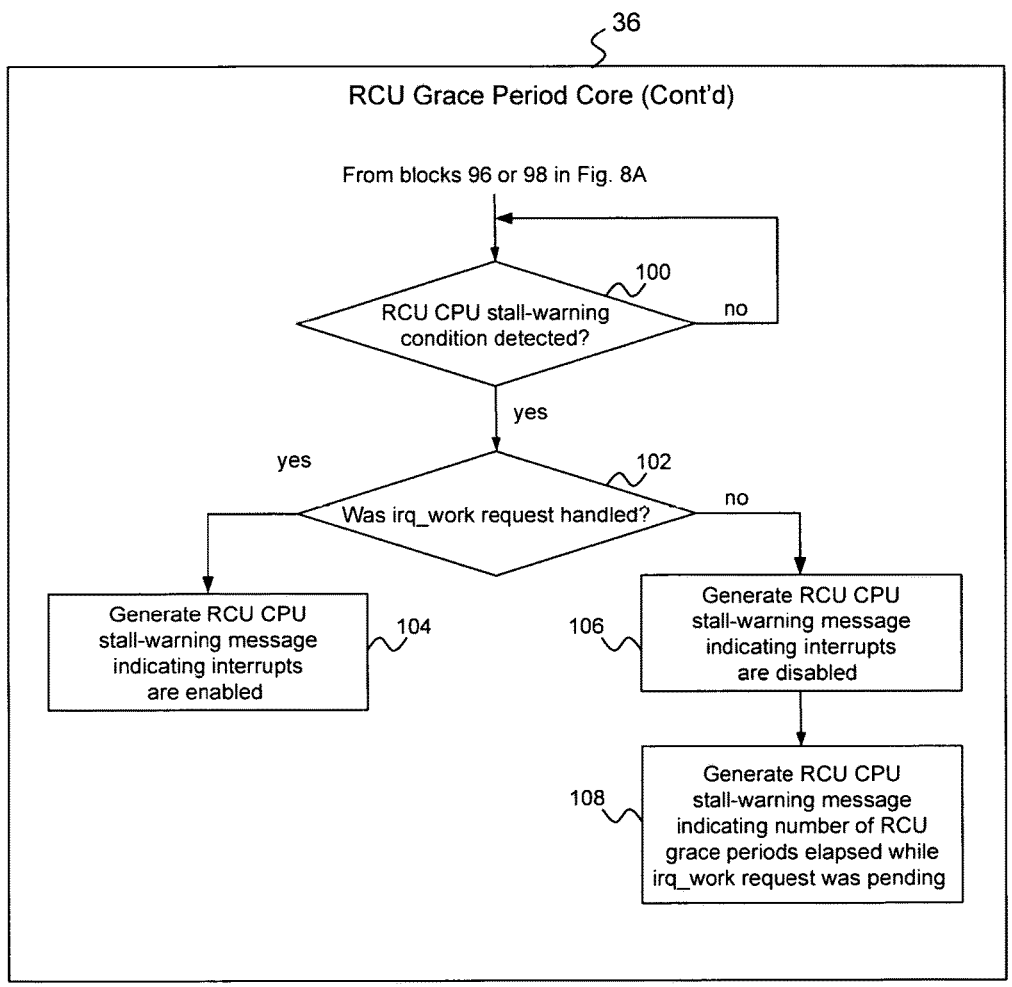

Turning now to FIGS. 8A-8B, example operations that may be performed to determine whether a CPU stalling an RCU grace period has interrupts enabled are shown. As noted in the discussion of FIG. 5 above, these operations may be implemented within the context of an RCU grace period kthread by the RCU grace period core 36 of the RCU subsystem 20.

In block 90 of FIG. 8A, an RCU grace-period number snapshot is incorporated into per-CPU state information maintained on behalf of the CPU 4. As discussed above, the RCU grace-period number snapshot serves as an interrupt work-state grace period indicator for the CPU 4. It may be implemented by the →rcu_iw_gnum field 70 of the CPU's rcu_data structure 56 that is occasionally reset to equal a current RCU grace period number represented by the →gpnum field 60 in the CPU's leaf rcu_node structure 54A. An interrupt work state of the CPU 4 is thereby implicitly initialized by virtue of the RCU grace period number being incremented during initialization of a new RCU grace period so as to be greater than the RCU grace-period number snapshot (e.g. as exemplified by the "GP-N>0" condition of irq_work state 84).

In block 92 of FIG. 8A, an interrupt work-request indicator is also incorporated into the per-CPU state information to indicate whether the CPU has an interrupt work request pending (e.g., as exemplified by the "PENDING" condition of irq_work state 86). As discussed above, the interrupt work-request indicator may be provided by the →rcu_i-w_pending field 68 of the CPU's rcu_data structure 56.

In block 94, periodic checks are made to determine if a current RCU grace period has endured for a predetermined time period relative to an RCU CPU stall-warning timeout interval (e.g., as exemplified by the "Halfway" condition in FIG. 7). If so, block 96 checks the RCU grace-period number snapshot (→rcu_iw_gpnum 70) and the current RCU grace period number (→gpnum 60) to determine if the CPU 4 is enabled for irq_work handling (e.g., as exemplified by the "GP-N>0" condition of state 84 in FIG. 7). Block 96 further checks the interrupt work-request indicator (→rcu_i-w_pending 68) to confirm that no previous irq_work request has been generated for handling by the CPU during the current RCU grace period (e.g., as exemplified by the IDLE condition of state 84 in FIG. 7). If both of the above conditions are satisfied, block 98 generates an irq_work request for handling by the CPU 4 if it is fully online. This operation may include initializing the rcu_iw structure 66 of the CPU 4's rcu_data structure 56, updating the CPU's interrupt work-request indicator (→rcu_iw_pending 68) to indicate that the CPU has a pending interrupt work request, and resetting the →rcu_iw_gpnum field 70 to equal the →gpnum field 60, thereby disabling the generation of additional irq_work requests for handling by the CPU. Processing proceeds to block 100 in FIG. 8B following the operations of block 98, or if an already-pending irq_work request was detected in block 96.

Block 100 of FIG. 8B periodically checks whether an RCU CPU stall-warning condition has been reached. If so, block 102 checks the interrupt work-request indicator (→rcu_iw_pending 68) to determine whether or not the CPU 4's irq_work request has been handled. Blocks 104 and 106 respectively issue corresponding RCU CPU stall-warning messages that report an interrupt-handling status of the CPU according to whether or not the irq_work request was handled. If block 102 determines that the irq_work request was handled, block 104 may generate an RCU CPU stall-warning message indicating that interrupts are enabled on the CPU 4. If block 102 determines that the irq_work request was not handled, block 106 may generate an RCU CPU stall-warning message indicating that interrupts are disabled on the CPU 4. In further response to the irq_work request not being handled, block 108 may use the CPU 4's RCU grace-period snapshot (→rcu_iw_gpnum 70) and the current RCU grace period number (→rcu gpnum 60) to determine how many grace periods elapsed while the irq_work request was pending, and include in the RCU CPU stall-warning message a report of the number of elapsed grace periods.

Accordingly, a technique has been disclosed for determining whether a CPU stalling an RCU grace period has interrupts enabled. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 4-8.

With respect to a computer program product, digitally encoded, computer readable program instructions (code) may be stored on one or more non-transitory computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Example computer readable data storage media for storing such program instructions are shown by reference numerals 8 (main memory) and 10 (cache) of the computer system 2 of FIG. 4. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs).

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM) such as a dynamic random access memory (DRAM) or a static random access memory (SRAM), a read-only memory (ROM), an erasable programmable read-only memory (EPROM or Flash memory), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives the computer readable program code from the network and forwards the computer readable program code for storage in a computer readable storage medium within the respective computing/processing device.

The computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawing figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method for determining if a CPU stalling a read-copy update (RCU) grace period has interrupts enabled, the method comprising:
    incorporating into per-CPU state information maintained on behalf of the CPU, an RCU grace-period number snapshot that serves as an interrupt work-state grace period indicator for the CPU, the RCU grace-period number snapshot being occasionally set to a current RCU grace period number, and an interrupt work state of the CPU being implicitly initialized by virtue of the RCU grace period number being incremented during initialization of a new RCU grace period so as to be greater than the RCU grace-period number snapshot;
    incorporating into the per-CPU state information an interrupt work-request indicator that indicates whether the CPU has an interrupt work request pending;
    determining if a current RCU grace period has endured for a predetermined time period relative to an RCU CPU stall-warning timeout interval;
    if so, using the RCU grace-period number snapshot, a current RCU grace period number and the interrupt work-request indicator to determine if an interrupt work request for handling by the CPU has been generated during the current RCU grace period;
    if not, generating an interrupt work request for handling by the CPU if it is fully online;
    updating the interrupt work-request indicator to indicate that the CPU has a pending interrupt work request;
    in response to an RCU CPU stall-warning condition, checking the interrupt work-request indicator to determine if the interrupt work request has been handled;
    issuing an RCU CPU stall-warning message that reports an interrupt-handling status of the CPU according to whether the interrupt work request was handled, the CPU interrupt-handling status indicating that interrupts were enabled if the interrupt work request was handled, or indicating that interrupts were disabled if the interrupt work request was not handled; and
    in response to the interrupt work request not being handled, using the RCU grace-period snapshot and a current grace period number to determine how many RCU grace periods elapsed while the interrupt work request was pending, and reporting the number of elapsed RCU grace periods in the RCU CPU stall-warning message.

2. The method of claim 1, further including protecting the RCU grace-period number snapshot using a lock that is also used to protect the RCU grace period number.

3. The method of claim 1, further including periodically checking for impending overflow of the RCU grace period number relative to the RCU grace-period number snapshot, and if so, updating the RCU grace-period number snapshot to prevent the overflow.

4. The method of claim 3, wherein the checking for impending overflow of the RCU grace period number relative to the RCU grace-period number snapshot is performed by the CPU when the CPU is non-idle and notes a new RCU grace period.

5. The method of claim 3, wherein the checking for impending overflow of the RCU grace period number relative to the RCU grace-period number snapshot is performed by an RCU grace-period kernel thread on behalf of the CPU if it enters an idle state.

6. The method of claim 1, wherein the RCU CPU stall warning message uses a compact representation of the CPU interrupt-handling status in which a single character indicator is either (1) a character indicating that the CPU had interrupts enabled for some part of the current RCU grace period, (2) a number indicating a count of RCU grace periods during which the CPU had its interrupts disabled, or (3) a character indicting that it is not possible to post an interrupt work request to the CPU because it was offline.

7. The method of claim 1, further including maintaining a fully-functional CPU list of CPUs that are fully online, and wherein generating an interrupt work request for handling by the CPU if it is fully online includes checking the fully-functional CPU list.

8. A system, comprising:
a plurality of CPUs;
a memory coupled to the CPUs, the memory including a computer readable storage medium tangibly embodying at least one program of instructions executable by the CPUs to perform operations for determining if a CPU stalling a read-copy update (RCU) grace period has interrupts enabled, the operations comprising:
incorporating into per-CPU state information maintained on behalf of the CPU, an RCU grace-period number snapshot that serves as an interrupt work-state grace period indicator for the CPU, the RCU grace-period number snapshot being occasionally set to a current RCU grace period number, and an interrupt work state of the CPU being implicitly initialized by virtue of the RCU grace period number being incremented during initialization of a new RCU grace period so as to be greater than the RCU grace-period number snapshot;
incorporating into the per-CPU state information an interrupt work-request indicator that indicates whether the CPU has an interrupt work request pending;
determining if a current RCU grace period has endured for a predetermined time period relative to an RCU CPU stall-warning timeout interval;
if so, using the RCU grace-period number snapshot, a current RCU grace period number and the interrupt work-request indicator to determine if an interrupt work request for handling by the CPU has been generated during the current RCU grace period;
if not, generating an interrupt work request for handling by the CPU if it is fully online;
updating the interrupt work-request indicator to indicate that the CPU has a pending interrupt work request;
in response to an RCU CPU stall-warning condition, checking the interrupt work-request indicator to determine if the interrupt work request has been handled;
issuing an RCU CPU stall-warning message that reports an interrupt-handling status of the CPU according to whether the interrupt work request was handled, the CPU interrupt-handling status indicating that interrupts were enabled if the interrupt work request was handled, or indicating that interrupts were disabled if the interrupt work request was not handled; and
in response to the interrupt work request not being handled, using the RCU grace-period snapshot and a current grace period number to determine how many RCU grace periods elapsed while the interrupt work request was pending, and reporting the number of elapsed RCU grace periods in the RCU CPU stall-warning message.

9. The system of claim 8, further including protecting the RCU grace-period number snapshot using a lock that is also used to protect the RCU grace period number.

10. The system of claim 8, further including periodically checking for impending overflow of the RCU grace period number relative to the RCU grace-period number snapshot, and if so, updating the RCU grace-period number snapshot to prevent the overflow.

11. The system of claim 10, wherein the checking for impending overflow of the RCU grace period number relative to the RCU grace-period number snapshot is performed by the CPU when the CPU is non-idle and notes a new RCU grace period.

12. The system of claim 10, wherein the checking for impending overflow of the RCU grace period number relative to the RCU grace-period number snapshot is performed by an RCU grace-period kernel thread on behalf of the CPU if it enters an idle state.

13. The system of claim 8, wherein the RCU CPU stall warning message uses a compact representation of the CPU interrupt-handling status in which a single character indicator is either (1) a character indicating that the CPU had interrupts enabled for some part of the current RCU grace period, (2) a number indicating a count of RCU grace periods during which the CPU had its interrupts disabled, or (3) a character indicting that it is not possible to post an interrupt work request to the CPU because it was offline.

14. The system of claim 8, further including maintaining a fully-functional CPU list of CPUs that are fully online, and wherein generating an interrupt work request for handling by the CPU if it is fully online includes checking the fully-functional CPU list.

15. A computer program product, comprising:
one or more non-transitory computer readable data storage media;
program instructions stored on the one or more computer readable data storage media for programming a data processing platform having a plurality of CPUs to perform operations for determining if a CPU stalling a read-copy update (RCU) grace period has interrupts enabled, the operations comprising:
incorporating into per-CPU state information maintained on behalf of the CPU, an RCU grace-period number snapshot that serves as an interrupt work-state grace period indicator for the CPU, the RCU grace-period number snapshot being occasionally set to a current RCU grace period number, and an interrupt work state of the CPU being implicitly initialized by virtue of the RCU grace period number being incremented during initialization of a new RCU grace period so as to be greater than the RCU grace-period number snapshot;
incorporating into the per-CPU state information an interrupt work-request indicator that indicates whether the CPU has an interrupt work request pending;
determining if a current RCU grace period has endured for a predetermined time period relative to an RCU CPU stall-warning timeout interval;
if so, using the RCU grace-period number snapshot, a current RCU grace period number and the interrupt work-request indicator to determine if an interrupt work request for handling by the CPU has been generated during the current RCU grace period;
if not, generating an interrupt work request for handling by the CPU if it is fully online;
updating the interrupt work-request indicator to indicate that the CPU has a pending interrupt work request;
in response to an RCU CPU stall-warning condition, checking the interrupt work-request indicator to determine if the interrupt work request has been handled;
issuing an RCU CPU stall-warning message that reports an interrupt-handling status of the CPU according to whether the interrupt work request was handled, the CPU interrupt-handling status indicating that interrupts were enabled if the interrupt work request was handled, or indicating that interrupts were disabled if the interrupt work request was not handled; and
in response to the interrupt work request not being handled, using the RCU grace-period snapshot and a current grace period number to determine how many RCU grace periods elapsed while the interrupt work request was pending, and reporting the number of elapsed RCU grace periods in the RCU CPU stall-warning message.

16. The computer program product of claim 15, further including periodically checking for impending overflow of the RCU grace period number relative to the RCU grace-period number snapshot, and if so, updating the RCU grace-period number snapshot to prevent the overflow.

17. The computer program product of claim 16, wherein the checking for impending overflow of the RCU grace period number relative to the RCU grace-period number snapshot is performed by the CPU when the CPU is non-idle and notes a new RCU grace period.

18. The computer program product of claim 16, wherein the checking for impending overflow of the RCU grace period number relative to the RCU grace-period number snapshot is performed by an RCU grace-period kernel thread on behalf of the CPU if it enters an idle state.

19. The computer program product of claim 16, wherein the RCU CPU stall warning message uses a compact representation of the CPU interrupt-handling status in which a single character indicator is either (1) a character indicating that the CPU had interrupts enabled for some part of the current RCU grace period, (2) a number indicating a count of RCU grace periods during which the CPU had its interrupts disabled, or (3) a character indicting that it is not possible to post an interrupt work request to the CPU because it was offline.

20. The computer program product of claim 15, further including maintaining a fully-functional CPU list of CPUs that are fully online, and wherein generating an interrupt work request for handling by the CPU if it is fully online includes checking the fully-functional CPU list.

* * * * *